C. H. JACKELS.
ANIMAL TRAP.
APPLICATION FILED APR. 23, 1915.
1,173,974.
Patented Feb. 29, 1916.
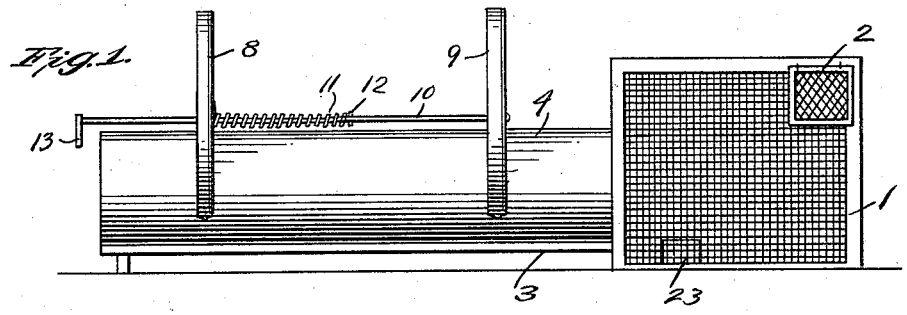
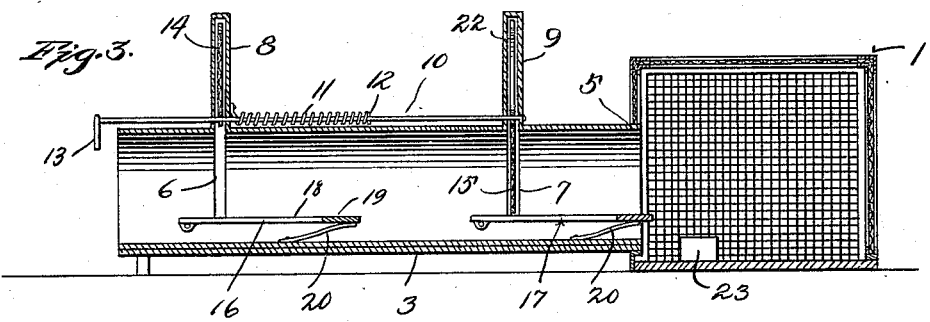
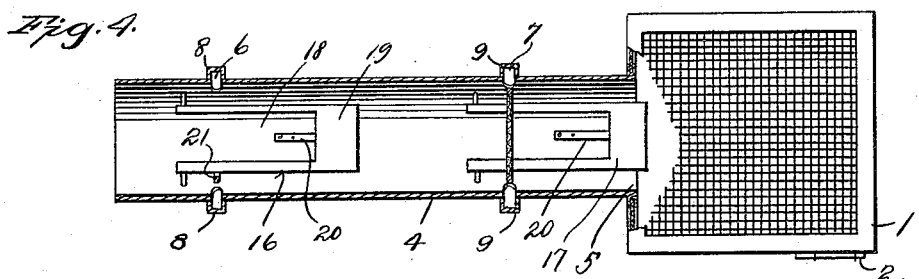
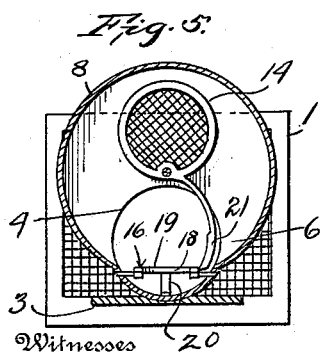
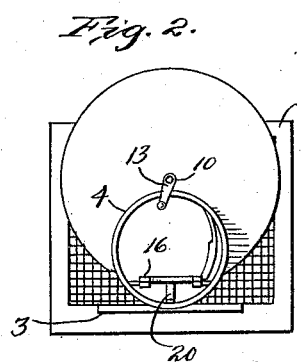
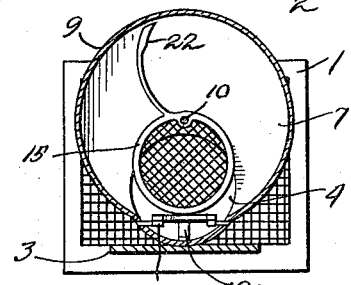
Inventor
C. H. Jackels
Witnesses
By
Attorneys

UNITED STATES PATENT OFFICE.

CHARLES H. JACKELS, OF ROSEDALE, KANSAS.

ANIMAL-TRAP.

1,173,974.  Specification of Letters Patent.  Patented Feb. 29, 1916.

Application filed April 23, 1915. Serial No. 23,483.

*To all whom it may concern:*

Be it known that I, CHARLES H. JACKELS, a citizen of the United States, residing at Rosedale, in the county of Wyandotte, State of Kansas, have invented certain new and useful Improvements in Animal-Traps; and I do hereby declare the following to be a full, clear, and exact description of the invention, such as will enable others skilled in the art to which it appertains to make and use the same.

This invention relates to an animal trap.

An object of the invention resides in the provision of a trap which will be operated by the entrance of an animal therein to set the trap for subsequent operation.

With this and other objects in view, such as will appear as the description progresses, my invention comprises the combination and arrangement of parts as set forth in and falling within the scope of the appended claim.

Referring to the drawing: Figure 1 is a side elevation of a trap constructed in accordance with my invention. Fig. 2 is an end elevation thereof. Fig. 3 is a longitudinal sectional view taken in a vertical plane. Fig. 4 is a horizontal sectional view through the runway, showing the gate operating mechanism. Fig. 5 is a transverse vertical sectional view through the runway showing the position of one of the gates when raised and allowing entrance into the runway. Fig. 6 is a similar view showing the gate closed.

Referring to the drawing wherein like parts are indicated by like characters throughout the several views: In the embodiment of my invention shown in the drawings, I have provided a cage 1 made preferably of sheet metal and having a door 2 therein. Extending outwardly from one side of the cage is a supporting shelf 3 on which is mounted a tubular runway 4 made preferably of sheet metal and having communication with the cage 1, as at 5. This runway is secured to the member 3 in any suitable manner. Formed in the upper portion of the runway 4 in spaced relation are two arcuate slots 6 and 7 concentric with the runway 4. Extending upwardly from the runway 4 and in alinement with the slots 6 and 7 are housings 8 and 9 of substantially semi-cylindrical formation. Extending between the housings 8 and 9 and rotatably mounted therein is a rod 10 which is encircled by a coil spring 11. This spring is secured to a pin 12 fast on the rod 10 at one of its ends and to the housing 8 at its other end. This rod is extended forwardly beyond the housing 8 and has an operating key 13 secured to the end thereof. Secured to the rod 10 within the housings 8 and 9 are circular gates 14 and 15 which rotate with the rod and extend therefrom in diametrically opposite directions so that as one gate closes the runway 4 the other is raised and located in its housing.

In order that one gate may be raised and the other lowered upon the passage of an animal through the runway 4, I have pivoted in the runway beneath the gates 14 and 15 tripping members 16 and 17 which have cut-out portions 18 therein and platforms 19. The platforms 19 are located toward the inner ends of the runway for a purpose which will be described. These trip members 16 and 17 are normally pushed upwardly by leaf springs 20 which bear against the under sides thereof. Secured to the gates 14 and 15 and extending in opposite directions thereto are cam members 21 and 22 which are arranged to be engaged by the trip member 16 when in their downwardly extending positions and thus maintain the gates stationary. Each of the gates 14 and 15 is constructed of wire mesh, the edges of which are bound by metallic strips. A bait box 23 of suitable construction is located in the cage 1 to attract the animals to cause them to enter the runway 4.

In operation assuming that the spring 11 is not under tension and it is desired to set the trap the key 13 is grasped and the rod 10 turned until the proper tension is had in the spring 11. When the key 13 is released care should be taken that the gate 14 is located in the housing 8 and the cam 21 engages the trip member 16. At this time the gate 15 will close the runway and the cam 22 will be located in the housing 9. The engagement of the trip member 16 with the cam 21 will maintain the gate 14 in its raised position and the gate 15 in its lowered position, closing the runway 4 against the tension of the spring 11. As the animal enters the runway 4 he passes through the space 18 on the trip 16 and beyond the vertical plane of the gate 14. When the animal steps upon the platform 19 his weight causes the platform to move downwardly about its pivot against the tension of the spring 20 and thus releases the cam 21. The coil spring 11 causes the gate 14 to swing downwardly and the gate 15 upwardly so that the exit of the animal is prevented by the gate 14 as it closes the runway and his entrance into the cage 1 is induced by the opening of the gate 15. The gate 15 is arrested in its raised position and the gate 14 in its lowered position by the engagement of the cam 22 with the trip 17 so that the rod 10 moves but one-half a revolution. As the animal passes farther through the runway 4 he passes the plane of the gate 15 and steps upon the platform 19 of the trip member 17, at which time the engagement of the cam 22 by the member 17 is destroyed, and the gate 15 is lowered while the gate 14 is raised, the movements of the gates being limited by the engagement of the cam 21 with the trip member 16. Thus the animal will be prevented from escaping from the cage 1 by the gate 15 and yet other animals will be allowed to enter the runway because of the fact that the gate 14 is raised.

From the foregoing description it will be readily seen that I have provided an animal trap which is exceedingly simple in construction, and yet one which will operate to successfully trap animals.

I have so constructed the device that a long tubular runway is provided so that the trap may be buried in the ground or in a corn shock.

While I have illustrated and described a particular embodiment of my invention, I have merely done so for the sake of convenience and I do not wish to be limited to that particular embodiment as it is obvious that numerous changes may be made in the details of construction thereof without in any way departing from the spirit of the invention or exceeding the scope of the appended claim.

What I claim is:—

An animal trap comprising a cage, a runway extending therefrom, said runway having spaced slots therein, housings secured to and extending outwardly of the runway in alinement with the slots, a rod rotatably engaged through the housings, oppositely extending gates secured to the rod within the housings, means for rotating the rod, a keeper member carried by each of the gates, and spring pressed trip members located in the runway and arranged to alternately engage and release the keeper members.

In testimony whereof, I affix my signature, in the presence of two witnesses.

CHARLES H. JACKELS.

Witnesses:
W. H. POE,
MINNIE B. MATNEY.

Copies of this patent may be obtained for five cents each, by addressing the "Commissioner of Patents, Washington, D. C."